United States Patent
Datsevich et al.

(10) Patent No.: US 7,626,061 B2
(45) Date of Patent: Dec. 1, 2009

(54) METHOD AND APPARATUS FOR CONTINUOUS DECOMPOSING WASTE POLYMERIC MATERIALS

(75) Inventors: Leonid Datsevich, Bayreuth (DE); Jorg Gerchau, Kirchenthumbach (DE); Frank Gorsch, Saalfeld (DE); Ralph Wolfrum, Mistelgau (DE)

(73) Assignee: MPCP GmbH, Bayreuth (DE)

( * ) Notice: Subject to any disclaimer, the term of this patent is extended or adjusted under 35 U.S.C. 154(b) by 235 days.

(21) Appl. No.: 11/681,945

(22) Filed: Mar. 5, 2007

(65) Prior Publication Data

US 2008/0081935 A1 Apr. 3, 2008

Related U.S. Application Data

(60) Provisional application No. 60/848,629, filed on Sep. 29, 2006.

(51) Int. Cl.
*C07C 4/00* (2006.01)

(52) U.S. Cl. .................. 585/241; 422/232; 252/373; 75/493; 75/505; 48/190; 48/197 R; 48/203; 48/206; 208/400; 208/403; 208/407; 208/414

(58) Field of Classification Search ............... 585/241; 252/373; 75/493, 505; 48/190, 197 R, 203, 48/206, 209, 210, 211, 212, 109; 422/232; 208/400, 403, 407, 414, 435

See application file for complete search history.

(56) References Cited

U.S. PATENT DOCUMENTS

| | | | |
|---|---|---|---|
| 5,656,044 A * | 8/1997 | Bishop et al. | 48/197 R |
| 5,821,396 A | 10/1998 | Bouziane | |
| 5,961,946 A * | 10/1999 | Takegawa et al. | 423/449.7 |
| 6,321,666 B1 | 11/2001 | Tigonen | |
| 2004/0106690 A1 * | 6/2004 | DeHaan et al. | 518/726 |

FOREIGN PATENT DOCUMENTS

| | | |
|---|---|---|
| DE | 100 51 246 A1 | 5/2001 |
| EP | 1 632 546 A1 | 3/2006 |
| RU | 2 186 295 C2 | 7/2002 |
| RU | 2 220 986 C1 | 1/2004 |
| WO | WO 2004/094562 A1 | 11/2004 |

* cited by examiner

*Primary Examiner*—In Suk Bullock
*Assistant Examiner*—Prem C. Singh
(74) *Attorney, Agent, or Firm*—Robert G. Weilacher; Smith, Gambrell & Russell, LLP

(57) ABSTRACT

A method and apparatus for the continuous recycling of hydrocarbon containing used and waste materials such as plastic and polymeric waste including, for example, polyurethane, rubber wastes and the like, and in particular scrap rubber tires, are disclosed. The process is carried out under moderate temperatures and atmospheric pressure in the presence of air and a feed of liquid(s) containing oxygen. The method is characterized by the low residence time.

14 Claims, 6 Drawing Sheets

METHOD AND APPARATUS FOR CONTINUOUS DECOMPOSING WASTE POLYMERIC MATERIALS

REFERENCE TO A RELATED APPLICATION

This application claims the benefit of our provisional application 60/848,629 filed Sep. 29, 2006, which is incorporated and relied on herein.

INTRODUCTION AND BACKGROUND

The present invention relates to the continuous processing of scrap tires, plastic and rubber wastes, and/or other polymeric materials into valuable chemicals and/or fuels.

In the world today, waste polymeric materials, especially spent and discarded vehicle tires litter the landscape of the developed countries, causing serious environmental and economic problems. In the USA alone, over 3 billion scrap tires have accumulated in the open air, with at least one location containing 30 million tires ("Markets for Scrap Tires" issued by the US Environmental Protection Agency, Office of Solid Waste, 1991). The landfills containing scrap tires are unsightly and expose ground and atmosphere to dangerous pollution. There are also several additional aspects, which raise a general public awareness associated with the dumps containing scrap tires. These include:

(i) Fire Hazard

Discarded tire dumps are prone to fires and once such a dump bursts into flames it will continue burning for months, creating acrid smoke and leaving behind a hazardous oily residue.

(ii) Expensive Disposing of Waste Tires in Landfills

The tipping fees for disposal of tires have trended upwards with continuous increases. For example, in the Los Angeles area, the tipping fees in 2007 have already been set to be about 10% higher compared to those in 2006 and make up $66.9 per ton.

(iii) Source of Mosquito Breeding

Because of the bulky and impermeable structure of tires piled in dumps, they may hold water for a long period providing exceptionally inviting breeding sites for mosquito larvae, which when developed into mosquitoes sustain the spread of diseases.

(iv) Deficiency of Land and Tightening of Environmental Regulations

For the purposes of tire disposal, it continually becomes more difficult to expand old landfills or find new sites for them.

In order to solve the problem concerning the waste tire accumulation, scrap tires should be recycled or reused. One of the recycling options is the chemical decomposition of tires in the course of which valuable products can be manufactured.

From a chemical point of view, a tire is a polymeric composite reinforced by both polymeric fibers and a steel cord. It is noteworthy that the requirements on the tire composition vary from producer to producer and depend upon the type of vehicles or industrial and other machines for which tires are destined. An example of the most common compounding ingredients is given in Table 1, below.

TABLE 1

Example of tire composition*

| Compound basic composition | Main compounding ingredients | Weight percent |
|---|---|---|
| Rubber | | 49.8% |
| | Natural rubber | 27.7% |
| | Synthetic rubber | 22.1% |
| Filler | | 26.1% |
| | Carbon black | |
| | Silica | |
| Reinforcing cord | | |
| | Textile (rayon, polyamides (e.g. nylon), polyester, aramid fibers etc.) | 4.1% |
| | Steel cord and bare wire | 14.1% |
| Compounding ingredients | | 5.9% |
| Vulcanizing agent | Sulfur, organic compounds | |
| Vulcanizing accelerator | Thiazole-type accelerators | |
| Promotor | Zinc oxide, stearic acid | |
| Antioxidant | Amines, phenolic compounds, waxes | |
| Softener | Petroleum-type oil, aromatic oil | |

*The source: Ullmann's Encyclopedia of Industrial Chemistry, 5th electronic edition It is necessary to point out that the tire material of today's tires comprises nearly all types of polymeric compounds that can also be found in other plastic wastes. This can be seen from Table 1. From this point of view, the present invention discloses the processing methods suitable for any plastic and rubber wastes as well as other polymeric materials.

It is understood that as used herein, the terms "tires or scrap/spent/worn/discarded/used/old/waste tires," and the like are used interchangeably and refer to the utilization/recycling/decomposition/processing/treatment of both scrap tires and other polymeric/plastic/rubber wastes.

It should be noted that the decomposition of scrap tires in the continuous operation mode is much more complicated than the continuous processing of other polymeric wastes because of a significant content of carbon (and steel) that cannot be completely converted into gaseous or liquid products and, therefore, should be permanently removed out of a decomposition reactor.

The decomposition processes of scrap tires mentioned in the available patent and scientific literature can be ranged into the following classes: pyrolysis, gasification and dissolution. It is necessary to point out that the reaction mechanism in all these processes has similar features so that the conventional classification is to some extent relative.

Conventionally, pyrolysis implies the process in which organic substances are reduced or cracked by subjecting a material to heat in the absence of oxygen. The pyrolytic reactions are endothermic, i.e. they demand a delivery of heat to a reactor. In general, the pyrolytic process can reduce scrap tires into three product streams: a liquid, a gas and carbon char.

U.S. Pat. No. 5,821,396 dated Oct. 13, 1998, of Bouzlane, entitled "Batch process for recycling hydrocarbon containing used materials", describes a process wherein pyrolysis of used tires is carried out in a batch rotating reactor under atmosphere of an inert gas in the range of 435-500° C. However, this method has distinct drawbacks related to the complex equipment and reactor design and to a batch operation mode necessitating the stages of the periodic heating and cooling of the reactor. The system also has to be vacuumed and then pressurized with an inert gas after every charging. It can be expected that batch operating demands cumbersome equipment not well suited for industrial needs.

Gasification processes comprise very complex reactions occurring during partial combustion (or oxidation) of scrap tires and simultaneous cracking of organic molecules. Gasification is characterized by considerably higher temperature than in pyrolytic processes and does not demand a heat supply. As a result, the products of gasification processes are gaseous and preferably used for heat generation.

The patent family of German Patent No. DE 10051246 issued on May 23, 2001, Russian Patent RU No. 2186295 issued on Oct. 27, 1999 and U.S. Pat. No. 6,321,666 dated Nov. 27, 2001, entitled "Cycle Installation for Utilization of Waste Containing Polymer Compounds", inventor Vladimir Tigonen, describes the typical gasification process carried out at high temperatures up to 1400° C. The technical object of that prior development is heat generated by the combustion of the tires. The gasification assembly requires a very large tank operated in a batch mode.

In general, gasification processes need a rigid connection to heat generation facilities installed on the same site. Otherwise, a gasification plant should be accompanied by a liquefaction station for gas storage and its transportation.

Dissolution of scrap tires is similar to the pyrolysis process. The scrap tire decomposition is carried out in a liquid medium in which shredded tires are submerged. In order to prevent evaporation of this liquid medium, the process runs under high pressure.

The patent family of International Patent No. WO2004094562 issued on Jan. 10, 2004, European Patent Application No. EP 1632546 and Russian Patent No RU 2220986 dated Jun. 10, 2004, entitled "Method of Processing Rubber-Containing Wastes", inventor Kiril Z. Bochaver, describes the method for destruction of rubber waste. The process is carried out at temperatures of 280-435° C. and pressures of 29-60 bar in an organic solvent that can be extracted from the liquid product and returned into the process.

The liquid, gas and solid compounds produced according to Bochaver have almost identical chemical properties and weight content as during the pyrolysis realized under the same temperatures.

Unfortunately, the time of the reaction is not specified in Bochaver's description. From practice it is known that the residence time is about 1 hour for the batch performance. Despite the fact that Bochaver refers to the reactor working in a continuous operation mode, this part of Bochaver's description has not been verified from a practical standpoint. All technical illustrations in this patent are presented by experiments brought about in a batch operation mode.

The commercial development of this prior art can encounter many technical difficulties especially related to the continuous process in the reactor under high pressure, such as: (a) the feed of the bulky shredded tires, (b) the removal of a solid product (carbon char) from the reactor, and (c) the withdrawal of the residual liquid remaining in this porous solid. Even if these problems were to be solved, the design of an industrial unit would be very complex and the reactor itself would be cumbersome. On the whole, solving all these problems will result in high capital and operation costs.

In applicants' view, there have been no realistic technical solutions appropriate for wide industrial applications. Despite the fact that compounds produced from the scrap tires are identical to those processed from crude oil and can be used for both the recycling of valuable chemicals and energy generation, the above-mentioned prior processes cannot thus far compete with petroleum refinery operation at today's prices. Applicants do not know of any example of successfully operated plants on an industrial scale.

It is believed the difficulties of an industrial operation proceed from the complicated and cumbersome reactor design, deposition of carbon as a by-product on the internal surfaces of the reactor, which tremendously worsens heat transfer, the necessity of complex feeding, discharging and transporting systems, and in the case of scrap tires, high costs of the further carbon recovery. All these factors result in high investment and operating costs.

SUMMARY OF THE PRESENT INVENTION

The present invention intends to provide a comparatively simple method and apparatus for continuous production of the valuable chemical compounds which then can be used as either raw materials for the manufacture of chemicals, plastic monomers and additives, transportation fuels and the like, or as an energy source for industrial and household purposes.

In the decomposition of scrap tires, there is a distinct dependence between the reaction temperature, residence time, and quality and quantity of gas and liquid products (as well as the purity of residual carbon char). The higher the temperature, the more intensive is the breaking of bonds in molecules, resulting in the production of low-molecular products and gases. On the other hand, reducing the reaction time at high temperature leads to a cessation of further destruction of a molecule so that a substantial portion of high-molecular weight, liquid products can be obtained. Thus, in the present invention, a choice of the process temperature is dictated by a compromise between a desirable palette of products and the reaction time (i.e. the reactor size). From a pragmatic point of view, it is preferable to minimize the residence time or, in other words, to use as small a reactor as possible.

The present invention relates to a continuous method for the decomposition of waste in the form of scrap tires, waste plastic polymer, rubber and mixtures of such waste and conversion thereof into valuable chemicals and/or fuels comprising shredding said waste, charging a reactor with the shredded waste, heating the shredded waste in the reactor at atmospheric pressure to the decomposition temperature of the waste, to form a reaction mixture, introducing into said reaction mixture a liquid compound containing oxygen and atmospheric air, while said waste is at its decomposition temperature to thereby at least partially oxidize said waste and utilize heat generated by said oxidation reaction to at least partially maintain the oxidation reaction inside said reactor, and utilizing water formed in said oxidation reaction to prevent deposition of carbon on surface inside the reactor.

In carrying out the method of the invention, the initial cut-up waste material, liquid compounds containing oxygen and atmospheric air can be fed into the reactor concurrently.

Alternatively, the initial cut-up waste material can be fed into the reactor countercurrently with respect to liquid compounds containing oxygen and atmospheric air.

Heat required for the reaction can be supplied through an external wall of said reactor, or be supplied by a coaxial heater. Still further, the heat for beginning the decomposition and for continuing the decomposition reaction can be supplied by a gas loop fed to the reactor where the gas is previously heated.

More particularly, the method of the invention is carried out under atmospheric pressure by continuously feeding shredded waste scrap into a feed hopper conveying the waste scrap by screw conveyor in a continuous flow of waste scrap to a tubular or annular reactor, heating said reactor to a temperature to begin decomposition of said waste scrap, introducing atmospheric air co-current or countercurrent to said continuous flow of waste scrap, introducing a liquid feed of an oxygen containing compound into said reactor and removing gaseous and liquid products from said reactor.

The decomposition of high-molecular compounds is an endothermic process demanding a continuous energy supply. That implies the necessity of the permanent delivery of heat to the reaction zone in order that the destruction of polymeric compounds occurs.

As follows from the description herein, the supply of heat needed for the reaction can be realized by two different methods that can be combined if necessary: (I) the delivery of heat produced outside the reactor, and (II) energy production inside the reactor by means of the oxidative reactions. The following description specifies both methods in detail.

(I) The heat required for the reaction is generated outside the reaction zone.

In this variation, the heat is delivered to the reactor by heat transfer through the surfaces of a heating system around the reactor and/or a coaxial heater. It is also possible to supply the heat by means of a loop connected to the reactor in which the recycled gas is previously heated.

The necessary energy for heat transfer can be produced by utilization of a part of the ultimate gaseous and liquid products produced in the process; e.g. by electric current (generated by burning), by direct burning in the heating systems or by usage of hot flue gases.

All the above-mentioned ways can be applied both separately and in any possible combination as is described hereafter.

It should be noted that in case (I), heat is not generated in the reactor, but supplied to it from the outside. In order to prevent (or lessen) a loss of energy, the reactor should be thoroughly insulated by thermal insulation.

(II) The heat requested for the reaction is generated inside the reactor by oxidation.

In this variation, atmospheric air identified in the Figures as stream 12 is used. This atmospheric air feed allows the solving of several problems: (i) the air feed forms not only the energy necessary for the reaction, but also (ii) provides for better mass and heat transfer inside the reactor. (iii) Finally, the air feed protects the feed hopper containing the shredded scrap tires (identified in Figures as 5) from contact with the reaction gases when the reactor operates in the concurrent mode (FIGS. 1, 3), and enables the additional purification of the residual carbon char from the reaction products condensed in any pores if the reactor works in the countercurrent mode.

It is to be further noted that the water formed during oxidation inhibits the carbon deposition on the reactor wall, which is a substantial problem in the conventional industrial processes.

Theoretically and practically, it is possible to carry out the process in such a way that the entire amount of energy required for the reaction can be produced completely through oxidation. Such a regime is called "autothermal" and, according to the meaning intended herein, corresponds to the full heat generation.

In experiments brought about in the laboratory and pilot-plant units, applicants do not achieve and do not want to achieve such an autothermal regime or, in other words, full heat generation. Since a quantity of heat obtained in oxidation is not enough for the reaction, applicants' experimental and pilot-plant reactors are equipped with an electric system (wire coiled around the reactor). An annular reactor is equipped with a coaxial electric heater installed inside.

When the shredded pieces of scrap tires enter the reactor assembly, they should first be heated to the temperature of 250-300° C. at which the decomposition process begins. During the passage of tire cuttings through the reactor operated at higher temperatures, the temperature rises from the lowest level at the reactor inlet where the shredded tires of low temperature come out of the feed hopper. Going through the reactor, the temperature of tire cuttings subjected to heating is gradually increased. Depending on the properties and nature of the treated wastes, the decomposition process begins at the temperature of 250-300° C. that can be found somewhere in the reactor. Unfortunately, such a temperature is not enough for the complete and fast extraction of all valuable compounds present in tires. Therefore, higher temperatures up to 850° C. (preferable up to 650° C.) are desired. The choice of temperature depends on the desired quality of the liquid and gas products as well as the reactor size. Account should be taken of the fact that the temperature cannot be extremely high because of the mechanical and chemical stability of available materials used for the reactor construction. Heat is spent on the cracking of molecules and partial evaporation of formed liquid compounds as well as on internal mass transfer of cracked substances from the porous bulk of residue carbon char. From the point of view of heat transfer, small tire chips are more preferable. However, the smaller the tire cuttings are, the higher are the costs for their shredding. In laboratory and pilot-plant sized reactors, the range of tire cuttings was 8-12 mm, although particles can be used that are both larger and smaller in size.

There are two competitive points that influence the choice of the size of shredded tires: technological versus economical.

From a technological point of view, it is preferable to use smaller particles because the smaller the shredded pieces, the easier will be the heating of them. Also, the extraction of steel inclusions (cord and bare wire) prior to the processing in the reactor can be carried out much easier if the size of the tire particles is small.

On the other hand, the smaller the cuttings are, the higher the cost of their preparation is.

Principally, there is no problem to process particles, for example, from 1 mm up to 30 mm. The size of the cuttings does not play a substantial role and will be defined depending on the requested output at a site and options provided by the producers of shredders and metal separators. For purposes of this invention, the term "shredded" is intended to mean particles generally smaller than 50 mm and preferably from 1 mm to 30 mm.

In the present invention, in order to prevent side reactions and the further decomposition of liquid and gaseous products, the liquid and gaseous products are quenched outside the reactor by the cooling accompanied by the simultaneous condensation of low-molecular compounds that under reaction conditions are in a gaseous state. The condensation can be arranged in such a way that liquid fractions of the desirable temperatures are permanently withdrawn.

Generally, the method of the present invention allows the carbon char to leave the reactor without containing organic substances or, at least, the organic content thereof is low. It even enables obtaining carbon black of an appropriate quality that can be sold or used for further processing.

In the prior art, for example, in pyrolytic processes, the required heat for the reaction is mainly delivered to the reaction zone through the reactor wall. The energy is entirely generated outside the reactor by burning the gaseous products formed during the pyrolysis. Such heat transfer through the surfaces has significant drawbacks in a practical realization. It is not efficient as it is accompanied by a loss of energy and demands a periodic cleaning of heat exchange surfaces.

In contrast to the conventional pyrolytic and dissolution processes, the present invention realizes the partial (or full) heat generation inside the reactor by partial oxidation of the reaction mixture by air.

As we have already explained above, heat required for the reaction can be fully or partly supplied by the oxidation reaction, in the course of which oxygen of the atmospheric air reacts with the organic compounds inside the reactor. If a quantity of generated heat covers the full demand for the reaction, such a regime is referred to as "autothermal". If not, it is referred to as "partial oxidation", i.e. the oxidation reaction provides only a part of the energy needed for the process purposes. In principle, it is possible to estimate the percentage of the partial oxidation, e.g. 25% corresponds to the situation when 25% of heat is generated due to oxidation and the rest 75% is delivered to the reactor by means of heat transfer from the outside.

If the amount of generated heat is not enough for an autothermal operation, an additional quantity of heat can be supplied either through the heat exchange surfaces or by a gas flow recycled through the reactor and heated outside the reactor.

In contrast to the prior art, wherein at least a part of the formed gaseous products is taken away from the reactor for the purposes of heating the process by burning outside, in the present invention this part of the gas is partially or entirely converted into heat inside the reactor.

Water formed during the oxidation inhibits the deposition of carbon on the surfaces inside the reactor. Additionally, water promotes the decomposition by decreasing the residence time and, as a result, enables using a reactor of small size.

In the present invention, for enhancement of such impacts, water or other oxygen containing compounds, or a mixture thereof is fed into the reactor.

It is necessary to note that the introduction of oxygen into the reactor simplifies the whole plant realization because it is not necessary to undertake special measures for careful hermetization of the reactor assembly.

According to the present invention, the decomposition reactor has a very simple design of tubular or annular form and possesses a comparatively small volume.

The heat for the reaction (if the heat generated by oxidation is not enough for the process) as well as for the start of operations can be delivered by means of three embodiments enumerated below—separately or in any possible combination: (1) by a heat jacket or electrical wire around the reactor; (2) by an immobile heater mounted axially inside the reactor; and (3) by a gas flow circulated through the reactor and previously heated outside the reactor.

The way in which heat is generated is not critical or essential for the present invention. It can be realized by any known means including electricity, use of a hot flue gas stream passing through the heat jacket, axial heater and a heat exchanger on the gas loop. It is also possible to arrange burning gaseous or liquid products directly in the above-mentioned devices. As a source of fuel for heating, a part of the gaseous or liquid products formed in the reaction operating according to the present invention is used.

In the present invention, for feeding and transportation of shredded tires through the reactor length followed by discharging of residual solid carbon char, a loose screw conveyor or loose rotary screw is used. As used herein, the expression "loose screw conveyor" or "loose rotary screw" means a flexible spiral or screw made of a comparatively hard wire or metal strip. The device is destined for the transportation of shredded tires through the whole reactor length and provides the permanent cleaning of filter 4 and the reactor surfaces. In the reactor, it has no fixed mechanical connections, and there is only one fastened coupling with a motor shaft. The conveyor has a sufficient clearance between the immobile reactor wall (and a coaxial heater). The conveyor/screw is relatively loose, floppy and pliable in order to have a possibility of "play" in the reactor space. Such a flexible embodiment can easily cope with any possible jam of rubber cuttings, which can always occur because of a very high grade of drag friction.

Thus, a loose screw conveyor or rotary screw means a flexible spiral/screw. The loose screw conveyor and loose rotary screw also provide for transportation of shredded scrap tires in the case of an annular reactor. Moreover, this transportation system ensures an immediate cleaning of any carbon deposition on the internal reactor surfaces if it even takes place.

Since in the course of the reaction, the formed streams can contain some liquid, the reactor is mounted in an inclined position and equipped with an outlet at the lower end through which the liquid and gaseous products are taken away. This outlet is provided with a filter for separating the residual solid particles from the gas and liquid flow. The solid residue is moved by a screw conveyor or rotary screw further from the liquid outlet and directed to the collecting hopper placed at the reactor end.

The quality and ratio of liquid and gaseous products obtained according to the present invention does not differ greatly from those generated by the pyrolytic or dissolution processes while the residual carbon char has less content of organic compounds and can possess a highly developed total surface area because of its porous structure.

It is important that the method of the present invention implements simple scaling up procedures ensuring a reactor design of any industrial scale.

BRIEF DESCRIPTION OF THE DRAWINGS

The present invention will be further understood with reference to the appended drawings; wherein:

FIGS. 5a, 5b and 5c are schematic views of the process of the invention in tubular or annular reactors according to FIGS. 1-4 equipped with a gas loop. The heating is performed by a hot flue gas (FIG. 5a), or by direct burning of gaseous or liquid products in the free space of a heat exchanger (FIG. 5b), or by direct burning of gaseous or liquid products in the loop space (FIG. 5c).

FIGS. 6a, 6b and 6c represent schematic designs of a coaxial heater. FIG. 6a relates to the heating by a hot flue gas, FIG. 6b to the direct burning of gaseous or liquid products, and FIG. 6c to the heating by electric current.

In FIG. 1-6, streams, feeds and apparatuses are identified as follows:

Figure 1:
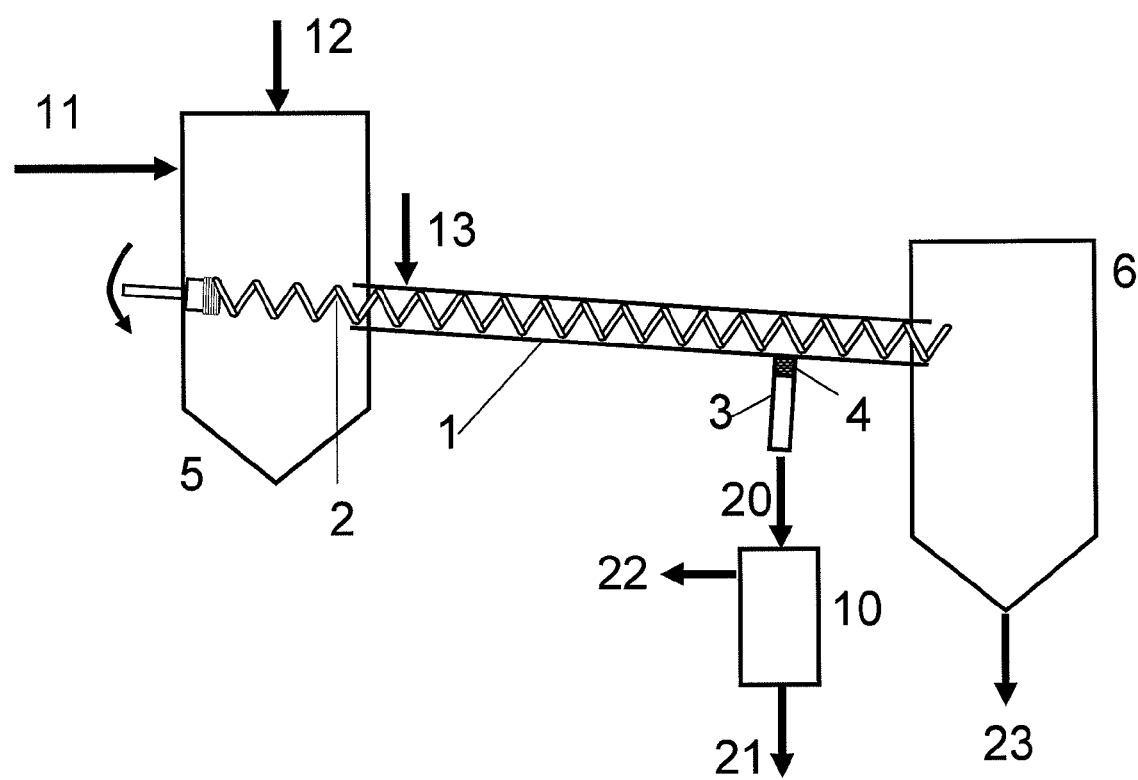
FIG. 1 is a schematic view of the process of the invention carried out in a concurrent mode in a tubular reactor. The heating system around the reactor is not shown.

1—reactor;
2—loose movable screw conveyor or rotary screw;
3—reactor outlet for gaseous and liquid products;
4—filter installed in the reactor outlet and cleaned by the screw conveyor or rotary screw;
5—feed hopper with shredded scrap tires;
6—hopper for residual carbon char;
7—coaxial heater;
8—bearing;
9—gas or liquid burner;
10—(fractional) condenser
11—feed of shredded scrap tires;
12—air feed for processing;
13—liquid feed of oxygen containing compound(s);
14—air/nitrogen purge;
20—gaseous and liquid products generated during the process;
21—liquid products;
22—gaseous products;
23—residual carbon char;
30—hot flue gas;
31—gaseous or liquid fuel (produced in the course of the process) for burners 9;
32—outtake of flue gases;
100—loop blower;
101—heat exchanger and/or jacket around the loop pipework;
102—burning chamber.

DESCRIPTION OF THE PREFERRED EMBODIMENTS OF THE INVENTION

The decomposition method of the present invention ensures the continuous processing of scrap tires into valuable chemical products and/or fuels at temperatures below 850° C. at atmospheric pressure and in the presence of a source of oxygen.

According to FIGS. 1-4, the previously shredded scrap tires 11 of a particle size of 1-30 mm (preferably 4-15 mm) are continuously supplied into feed hopper 5 where the level of shredded cuttings is kept constant. The scrap tire cuttings can include the fragments of the steel cord and bare wire, or these fragments can be extracted from the shredded tire scrap before, for instance, by the well-known magnetic separation (for particles less than 15 mm).

Loose screw conveyor or rotary screw 2 picks up the shredded tires in feed hopper 5 and forwards them into reactor 1.

Figure 2:
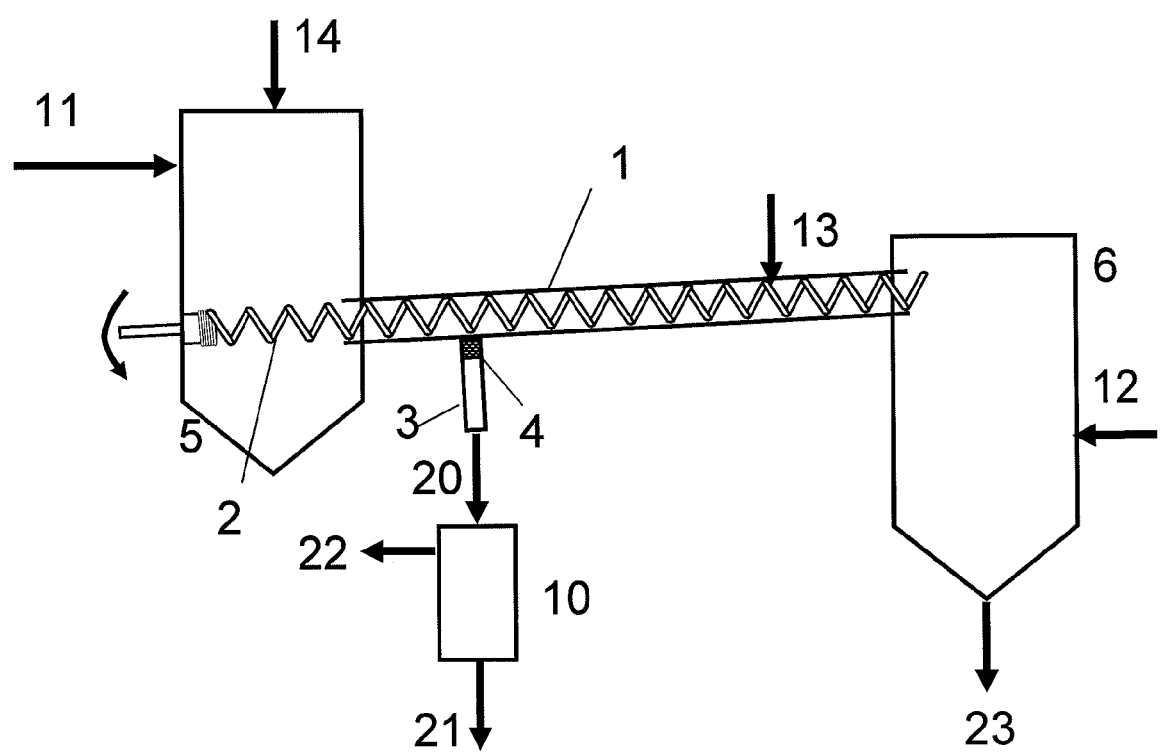
FIG. 2 is a schematic view of the process of the invention carried out in a countercurrent mode in a tubular reactor. The heating system around the reactor is not shown.

Reactor 1 in FIGS. 1 and 2 is a tubular type and should be equipped with a heating device fitted on the outer reactor wall (not shown).

Figure 3:
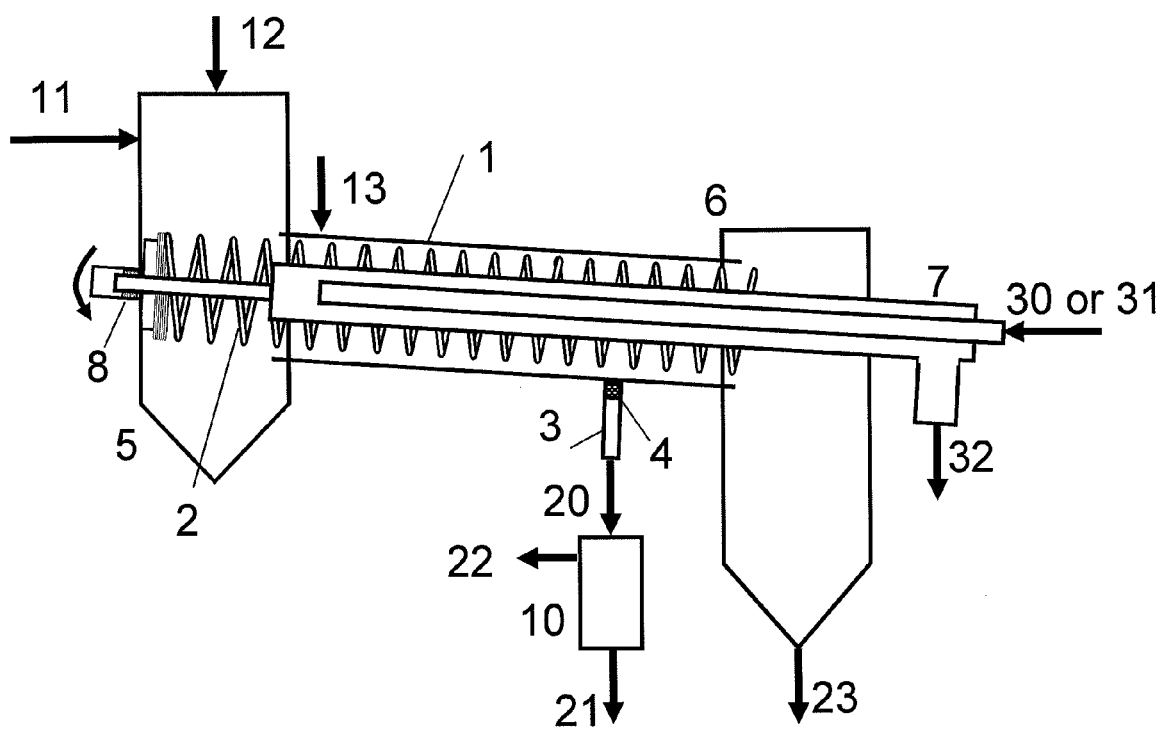
FIG. 3 is a schematic view of the process of the invention carried out in a concurrent mode in an annular reactor with a coaxial heater. An optional heating system around the reactor is not shown.
Figure 4:
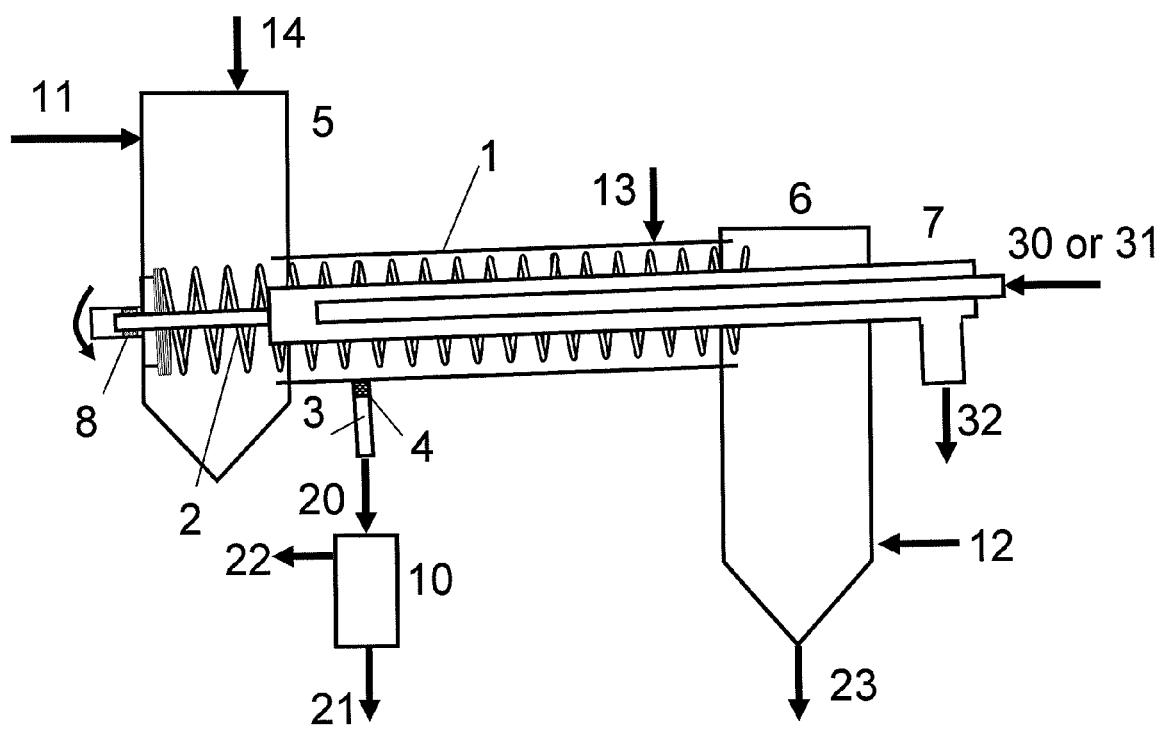
FIG. 4 is a schematic view of the process of the invention carried out in a countercurrent mode in an annular reactor with a coaxial heater. An optional heating system around the reactor is not shown.

Reactor 1 in FIGS. 3 and 4 is an annular type. This annular reactor includes coaxial heater 7 and can be optionally equipped with the heating device mounted on its outer wall.

The purpose of the heating device and coaxial heater 7 is to provide heat for the start of operation and/or the reaction if heat generated by partial oxidation is not enough to achieve the necessary process temperature. This heat transfer can be realized by any of the above-mentioned means (see section "Summary of the present invention").

The process in reactor 1 is carried out at a temperature below 850° C., preferably below 650° C. The upper process temperature is not limited. However, from the point of view of available materials and their chemical and mechanical stability, it should be less than 850° C. The necessary temperature in reactor 1 is provided both by oxidation of the gases generated during the process with process air 12 and by heating through the outer reactor wall, or by means of coaxial heater 7.

The applicants' experimental and pilot-plant units are fitted out with the computational monitoring of the energy supplied by the electric current and with the control system for keeping the constant temperature in some chosen point of the reactor. This enables the possibility of setting the required temperature and measurement of the temperature profile along the whole reactor length.

Carrying out experiments without the air and scrap tire feeds, it can be defined how much energy is lost at the given temperature due to the heat dissipation into the surroundings. Starting feeding the shredded tires without the air supply, it can be determined what quantity of energy is required for the decomposition process taking into account the heat loss. When the feed of air is begun, the requirement for the electric energy becomes less because of supplementary heat formation due to oxidation.

As point out above, applicants' experiments are carried out under conditions when the quantity of the air is not enough for the complete heat generation. As used herein, such a regime is called "partial oxidation", which means that the heat generated during oxidation only partly covers the required energy for the reaction.

Now, it is explained how the temperature (in other words, heat release) is controlled. If due to oxidation, the heat generated by oxidation is sufficient for the reaction to proceed, the necessary temperature in the reactor is kept constant by the regulation of the volume or mass flow rate of the air fed into the reactor. If we realize the partial oxidation, the temperature is controlled by the heating degree of the heating system mounted around the reactor, the coaxial heater, and/or the recycled gas in the loop. All these methods for temperature control are widely known in many applications that can be encountered in industry, for example, in different chemical plants.

As shown in FIGS. 1 and 3, liquid feed of oxygen containing compounds 13 is introduced into the reactor 1 after the tire scrap leaves the feed hopper 5. Reactor 1 is provided with a reactor outlet 3 for gaseous and liquid products together with a filter 4 installed in or near the reactor outlet. The filter can be cleaned by operation of the screw conveyer/rotary screw. The gaseous and liquid products 20 flow to the (fractional) condenser 10 for recovery of liquid products 21 and gaseous products 22.

Hopper 6 is provided to collect the residual carbon char 23 for recovery thereof.

In the countercurrent mode of operations shown in FIGS. 2 and 4, air feed for processing 12 is introduced into the hopper 6 and the liquid feed of oxygen containing compounds 13 is introduced into the reactor outside the hopper 6. The air/nitrogen purge 14 is provided in feed hopper 5.

In the embodiment shown in FIGS. 3 and 4, an annular reactor 1 is provided with a coaxial heater 7. The screw conveyer or rotary screw 2 is mounted in bearing 8 located with feed hopper 5. Hot flue gas 30 or a gaseous or liquid fuel 31 produced in the course of the process from furnace 9 (see FIG. 6a) is introduced into the axial reactor. An outlet for the flue gases is provided at 32.

Figure 6:
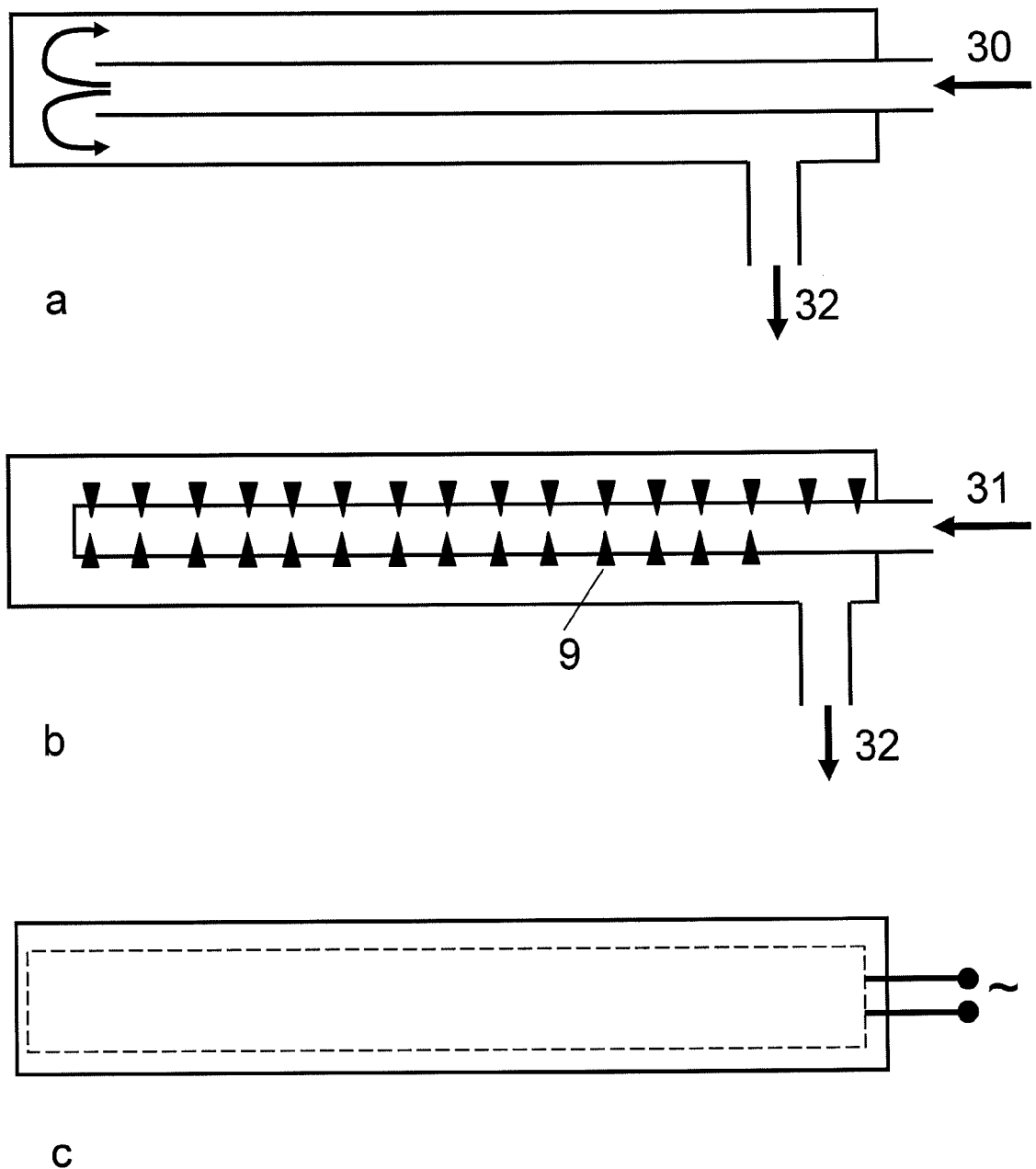

The possible variants of means for energy delivery to coaxial heater 7 are shown schematically in FIGS. 6a, 6b and 6c and include the heating by hot flue gas 30 (FIG. 6a), by the burning of process products 31 (FIG. 6b) or by the electric current generated using the process products (FIG. 6c).

For the improved performance of the decomposition process obtainable in accordance with the present invention, the shredded scrap tires are subjected to a liquid stream 13 comprising a source of oxygen; namely, oxygen containing compounds such as one or more ketones (e.g. acetone), alcohols (e.g. methanol, ethanol), ethers, polyethane, peroxides, epoxides, furan derivatives, water and the like or mixtures thereof. This liquid feed 13 of oxygen containing compound(s) is provided by a feeder element (not shown in detail).

Since the method according to the present invention is carried out under atmospheric pressure, any possible and well-known technical methods and devices can be applied to feed a liquid 13 into the reactor 1. Preferably, the liquid is delivered by a pump. In another embodiment of the invention, the liquid is supplied from a tank being under higher pressure or being placed on a higher level than the reactor. Alternatively, the liquid (if only water without any other compounds is used) is taken from the plumbing or water supply system on the site. In all cases, the flow rate of the liquid can preferably be adjusted by any mass flow controller, rotameter, etc. It is also possible to use a measuring (dosing) pump.

While the shredded scrap tires pass through reactor 1, high-molecular compounds are converted to the liquid and gaseous substances. Since reactor 1 is mounted in an inclined position, it facilitates the output of the liquid if the temperature is below 400-600° C. The products formed in the course of the decomposition are taken away through outlet 3 which is located at the lower end or reactor 1. It is necessary to bear in mind that the temperature in the reactor along its whole length is not constant. It has the minimum at the reactor inlet (25-70° C.) and the maximum at some position further into the reactor. As applicants refer to the process temperature (e.g. see Table 2), the maximal temperature in the reactor is meant.

According to applicants' understanding, apart from the numerous chemical reactions there are very complex physical processes. In the hottest part of the reactor, the reaction products including liquids can be found to be completely or to some extent in a gaseous/vapor state. Due to the temperature difference in the reactor, the vapors always go to the direction of the lower temperature where they can be condensed. At the reactor outlet for gaseous and liquids products (specified in Figures as 3), they are partly liquefied subjected to cooling in the condenser (specified in Figures as 10).

Reaction products 20 are cooled in condenser 10. Gas 22 and liquid 21 from condenser 10 can be used for heat generation for the process and burning for technological needs at the site or for electricity generation. It is also possible to carry out the continuous fractional distillation of product stream 20 so that the liquid products of given properties are obtained.

The analyses show that applicants' liquid products can be compared with the crude oil of a very high quality (without asphaltenes) or refinery streams yielded after atmospheric distillation.

The gaseous products are hydrogen, carbon monoxide, methane, ethane, propane and other gaseous hydrocarbons.

From this point of view, the ultimate products can be regarded not only as energy carriers for burning, but also as valuable raw materials for different chemical syntheses.

Filter 4 in outlet 3 provides for the previous separation of product stream 20 from particles of carbon char. The position of filter 4 allows it to be cleaned by loose screw conveyor or rotary screw 2.

Traveling through the remaining part of reactor 1, residual carbon char 23 is discharged into hopper 6, from which it is unloaded for the further processing. When steel cord and bare wire are not removed from the feed of scrap tires 11, they can be extracted from carbon chair 23 by, for example, the magnetic separation method.

According to the present invention, two flow regimes can be realized: concurrent or countercurrent.

In the concurrent operation (FIGS. 1 and 3), shredded cuttings of scrap tires 11 move in the same direction as process air 12 and oxygen containing compound(s) 13. In the countercurrent mode (FIGS. 2 and 4), shredded scrap tire 11 is transported against the flow of process air 12 and of oxygen containing compound(s) 13. In this embodiment, a purge of feed hopper 5 by air or nitrogen 14 is carried out.

Figure 5:
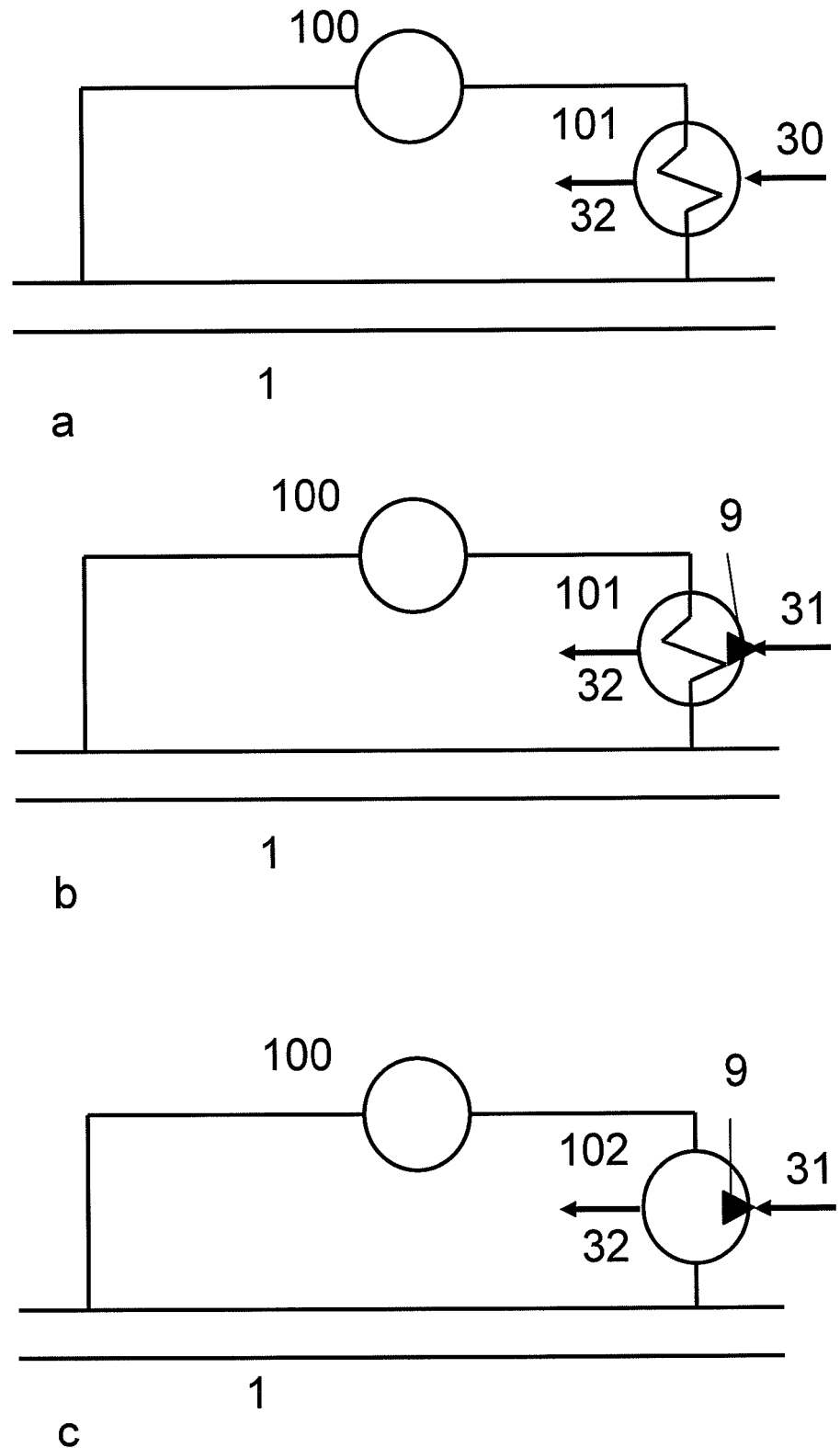

For the purposes of the more efficient supply of energy into reaction zone 1, in the framework of the present invention, the processes according to FIGS. 1-4 can be combined with a gas loop depicted in FIGS. 5a, 5b and 5c, wherein the recirculation is carried out by blower 100. The recycled gas stream can be heated in heat exchanger or jacket 101 around the loop pipework, or in burning chamber 102 (FIG. 5c).

The process parameters of the decomposition process are given in Table 2.

TABLE 2

| Process parameters | | |
|---|---|---|
| Temperature (° C.) | <850 | more preferable <650 |
| Residence time in the reaction zone (min) | 3-25 | more preferable 5-20 |
| Ratio of volume flow rate of air feed 12 to mass flow rate of shredded scrap tires 11 ($Nm^3/kg$) | 0-1 | more preferable 0-0.6 |
| Ratio of volume flow rate of oxygen containing compound(s) 13 to mass flow rate of shredded scrap tires 11 (kg/kg) | 0.005-0.1 | more preferable 0.005-0.05 |

The yield of all products and the fractional content of liquid are given in Tables 3 and 4, respectively.

TABLE 3

| The yield of the process products 21, 22 and 23 | |
|---|---|
| Stream | Feed or yield of products (%) |
| Shredded scrap tires 11 (without steel cord and bear wire) | 100 |
| Liquid 21 | 40-47 |
| Gas 22 | 15-23 |
| Carbon char* | 33-38 |

*Total surface area (BET) >80 $m^2/g$

TABLE 4

| Fractional content of liquid product 21 | |
|---|---|
| Temperature range (° C.) | Weight fractional (%)* |
| 50-100 | 14 |
| 100-150 | 16 |
| 150-200 | 14 |
| 200-250 | 18 |
| 250-300 | 16 |
| 300-350 | 16 |
| >350 | 6 |

*Defined by a thermogravimetry (TG) method

Further variations and modifications of the foregoing will be apparent to those skilled in the art and are intended to be encompassed by the claims appended hereto.

The invention claimed is:

1. A continuous method for the decomposition of waste in the form consisting of scrap tires, waste plastic polymer, rubber and mixtures of such waste into valuable liquid chemicals and/or liquid fuels, said method comprising:

shredding said waste, continuously feeding shredded waste scrap into a feed hopper, conveying the waste scrap by screw conveyor in a continuous flow of waste scrap to a tubular or annular reactor;

charging said reactor with said waste, heating said waste in said reactor to its decomposition temperature below 850° C. and under atmospheric pressure, to form a reaction mixture, introducing into said reaction mixture a liquid compound containing oxygen and atmospheric air co-current or countercurrent to the continuous flow of waste scrap, while said waste is at its decomposition temperature to thereby at least partially oxidize said waste and utilize heat generated by said oxidation reaction to at least partially maintain said oxidation reaction inside said reactor, and utilizing water formed in said oxidation reaction to prevent deposition of carbon on surfaces inside the reactor, wherein a residence time in the reactor ranges from 3 to 25 min.

2. The method as claimed in claim 1, wherein an initial waste material, liquid compounds containing oxygen and atmospheric air are fed into a reactor concurrently.

3. The method as claimed in claim 1, wherein an initial waste material is fed into a reactor countercurrently with respect to liquid compounds containing oxygen and atmospheric air.

4. The method as claimed in claim 1, wherein heat for beginning the decomposition and partially for the continuation of decomposition is supplied through an external wall of said reactor.

5. The method as claimed in claim 1, wherein heat for beginning the decomposition and partially for the continuation of decomposition is supplied by an coaxial heater.

6. The method as claimed in claim 1, wherein heat for beginning the decomposition and for the continuation of decomposition is supplied by a gas loop where the gas is previously heated.

7. The method according to claim 1, wherein said waste has a particle size of 1 to 200 mm.

8. The method according to claim 7, wherein the particle size is 4-15 mm.

9. The method according to claim 1, wherein steel cord and bare wire fragments are removed prior to heating said waste or after its processing.

10. The method according to claim 1, wherein the liquid compound containing oxygen is a member selected from the group consisting of ketones, alcohols, ethers, polyethers, peroxides, epoxides, furan derivatives, water and mixtures thereof 11. The method according to claim 10, wherein said liquid compound containing oxygen is acetone, methanol, ethanol, water or mixtures thereof.

12. The method according to claim 1, further comprising recovering at least one of hydrogen, carbon monoxide, a gaseous hydrocarbon and carbon.

13. The method according to claim 1 wherein liquid oil and solid, oil free carbon is recovered.

14. The method according to claim 1 wherein the residence time ranges from 5 to 20 min.

* * * * *